US012745764B2

(12) United States Patent
Maurer et al.

(10) Patent No.: US 12,745,764 B2
(45) Date of Patent: Sep. 29, 2026

(54) HYDRAULIC SPRAY NOZZLE

(71) Applicant: Precision Planting LLC, Tremont, IL (US)

(72) Inventors: Garrett Maurer, Moorhead, MN (US); Daniel R. Wood, Jr., Fargo, ND (US)

(73) Assignee: Precision Planting LLC, Tremont, IL (US)

( * ) Notice: Subject to any disclaimer, the term of this patent is extended or adjusted under 35 U.S.C. 154(b) by 1036 days.

(21) Appl. No.: 17/618,197

(22) PCT Filed: Jun. 12, 2020

(86) PCT No.: PCT/US2020/037401
§ 371 (c)(1),
(2) Date: Dec. 10, 2021

(87) PCT Pub. No.: WO2020/252239
PCT Pub. Date: Dec. 17, 2020

(65) Prior Publication Data
US 2022/0264865 A1 Aug. 25, 2022

Related U.S. Application Data

(60) Provisional application No. 62/861,816, filed on Jun. 14, 2019.

(51) Int. Cl.
*A01M 7/00* (2006.01)
*A01C 23/00* (2006.01)
*B05B 1/30* (2006.01)
*F16K 31/04* (2006.01)
*F16K 37/00* (2006.01)

(52) U.S. Cl.
CPC ......... *A01M 7/0089* (2013.01); *A01C 23/007* (2013.01); *B05B 1/3046* (2013.01); *F16K 31/046* (2013.01); *F16K 37/0041* (2013.01); *F16K 37/005* (2013.01)

(58) Field of Classification Search
CPC ... B05B 1/3046; B05B 1/3093; A01M 7/0089
USPC .......................... 239/119, 124–127, 164–170
See application file for complete search history.

(56) References Cited

U.S. PATENT DOCUMENTS 4,460,127 A * 7/1984 Hofmann ................ E01C 23/22 239/126
4,709,857 A 12/1987 Wilger
(Continued)

FOREIGN PATENT DOCUMENTS

EP 2511783 A2 10/2012
WO 2019204085 A1 10/2019

OTHER PUBLICATIONS

International Search Report and Written Opinion for PCT Application No. PCT/US2020/037401, Dated Sep. 11, 2020, p. 12.
(Continued)

*Primary Examiner* — Cody J Lieuwen

(57) ABSTRACT

A hydraulic spray nozzle for an agricultural implement includes at least one of a bleed valve and an annular valve. The bleed valve is configured to control flow of a bleed portion of the liquid provided to the nozzle for spraying. The bleed portion can be routed back to a supply tank for later use. The bleed valve can be an annular valve. A spray valve within the nozzle can also be an annular valve.

18 Claims, 7 Drawing Sheets

(56) References Cited

U.S. PATENT DOCUMENTS

| | | | | |
|---|---|---|---|---|
| 5,035,357 | A * | 7/1991 | Brickell | B05B 12/00 137/489.5 |
| 5,326,036 | A | 7/1994 | Wilger | |
| 6,036,107 | A * | 3/2000 | Aspen | B05B 9/0423 137/884 |
| 6,053,427 | A | 4/2000 | Wilger et al. | |
| 6,126,088 | A | 10/2000 | Wilger et al. | |
| 10,462,985 | B2 | 11/2019 | Wilger | |
| 11,125,681 | B2 | 9/2021 | Harlow et al. | |
| 2015/0115058 | A1 | 4/2015 | Wilger | |
| 2017/0036228 | A1 * | 2/2017 | Thurow | A01M 7/0042 |
| 2019/0029170 | A1 * | 1/2019 | Wilger | B05B 12/006 |
| 2019/0166775 | A1 | 6/2019 | Wilger | |
| 2019/0232304 | A1 * | 8/2019 | Grimm | B05B 12/126 |
| 2019/0339103 | A1 | 11/2019 | Wilger et al. | |
| 2020/0221682 | A1 * | 7/2020 | Grimm | B05B 1/3053 |
| 2021/0176977 | A1 * | 6/2021 | Bremer | B05B 12/08 |

OTHER PUBLICATIONS

Wilger, "Wilger Electronic Flow Monitoring System," p. 4.

International Preliminary Report on Patentability for PCT Application No. PCT/US2020/037401, Dated Dec. 23, 2021, p. 9.

* cited by examiner

HYDRAULIC SPRAY NOZZLE

CROSS-REFERENCE TO RELATED APPLICATION(S)

This application claims the benefit of U.S. Provisional Application No. 62/861,816, filed Jun. 14, 2019 and entitled "HYDRAULIC SPRAY NOZZLE," the disclosure of which is hereby incorporated by reference in its entirety.

BACKGROUND

This disclosure relates generally to spray nozzles. More particularly, this disclosure relates to annular valves in hydraulic spray nozzles for use in agricultural spraying systems.

Spray nozzles emit liquid sprays for application on various surfaces. Spray nozzles emit the liquid through a spray orifice. The spray characteristics of the liquid spray, such as the shape of the fan and the size of the droplets, vary based on the dimensional characteristics of the spray orifice, such as size and shape, and the flow characteristics of the liquid, such as flow rate and pressure. The pressure and flow rate of the liquid through the nozzle also affects the spray characteristics. Spray nozzles include internal valving to control the liquid flow to the spray orifice.

SUMMARY

According to one aspect of the disclosure, a nozzle for an agricultural spraying implement includes a nozzle body configured to mount to a distribution line extending from a supply tank holding a supply of liquid for spraying; a flowpath extending through the nozzle body between the distribution line and a spray outlet, wherein the flowpath includes an inlet path extending from the distribution line to an intersection, a bleed path extending from the intersection, and a spray path extending from the intersection; a bleed valve disposed on the bleed path and configured to control flow of a bleed portion of the liquid through the bleed path; an orifice valve disposed on the spray path and configured to control flow of a spray portion of the liquid through the spray outlet; a pressure sensor disposed on the spray path and configured to generate pressure data regarding the spray portion; and a flow meter disposed in the nozzle body and configured to generate flow data regarding the spray portion.

According to another aspect of the disclosure, a nozzle for an agricultural spraying implement includes a nozzle body configured to mount to a distribution line extending from a supply tank holding a supply of liquid for spraying; a flowpath extending through the nozzle body between the distribution line and a spray outlet; a flow control valve disposed on the flowpath and configured to control flow of the liquid through the flowpath; an orifice valve disposed on the flowpath and configured to control flow of a spray portion of the liquid through the spray outlet; a pressure sensor disposed on the flowpath between the flow control valve and the orifice valve, the pressure sensor configured to generate pressure data regarding the liquid. The flow control valve is an annular valve.

According to yet another aspect of the disclosure, an agricultural spraying implement includes a storage tank supported by the agricultural spraying implement and configured to store a supply of spray liquid; a plurality of nozzles configured to receive the spray liquid from the storage tank; and a bleed line extending from the nozzle to the storage tank. A first one of the plurality of nozzles includes a nozzle body configured to mount to a distribution line extending from the supply tank; a flowpath extending through the nozzle body between the distribution line and a spray outlet, wherein the flowpath includes an inlet path extending from the distribution line to an intersection, a bleed path extending from the intersection, and a spray path extending from the intersection; a flow control valve disposed on the inlet path upstream of the intersection, the flow control valve configured to control flow of the liquid through the inlet path to the intersection; a bleed valve disposed on the bleed path and configured to control flow of a bleed portion of the liquid through the bleed path; an orifice valve disposed on the spray path and configured to control flow of a spray portion of the liquid through the spray outlet; a pressure sensor disposed on the spray path and configured to generate pressure data regarding the spray portion; and a flow meter disposed in the nozzle body and configured to generate flow data regarding the spray portion. The bleed line is fluidly connected to the bleed path to receive the bleed portion from the bleed path.

According to yet another aspect of the disclosure, a method includes actuating, by a controller, a first spray valve of an agricultural spray nozzle to a first spray position; sensing, by at least one of a pressure sensor and a flow meter, a flow parameter of a spray portion of liquid flowing to the first spray valve; and actuating, by the controller, a bleed valve of the agricultural spray nozzle to a bleed position based on the sensed flow parameter, the bleed valve allowing a bleed portion of the liquid to flow out of the nozzle without being sprayed.

DETAILED DESCRIPTION

Figure 1:
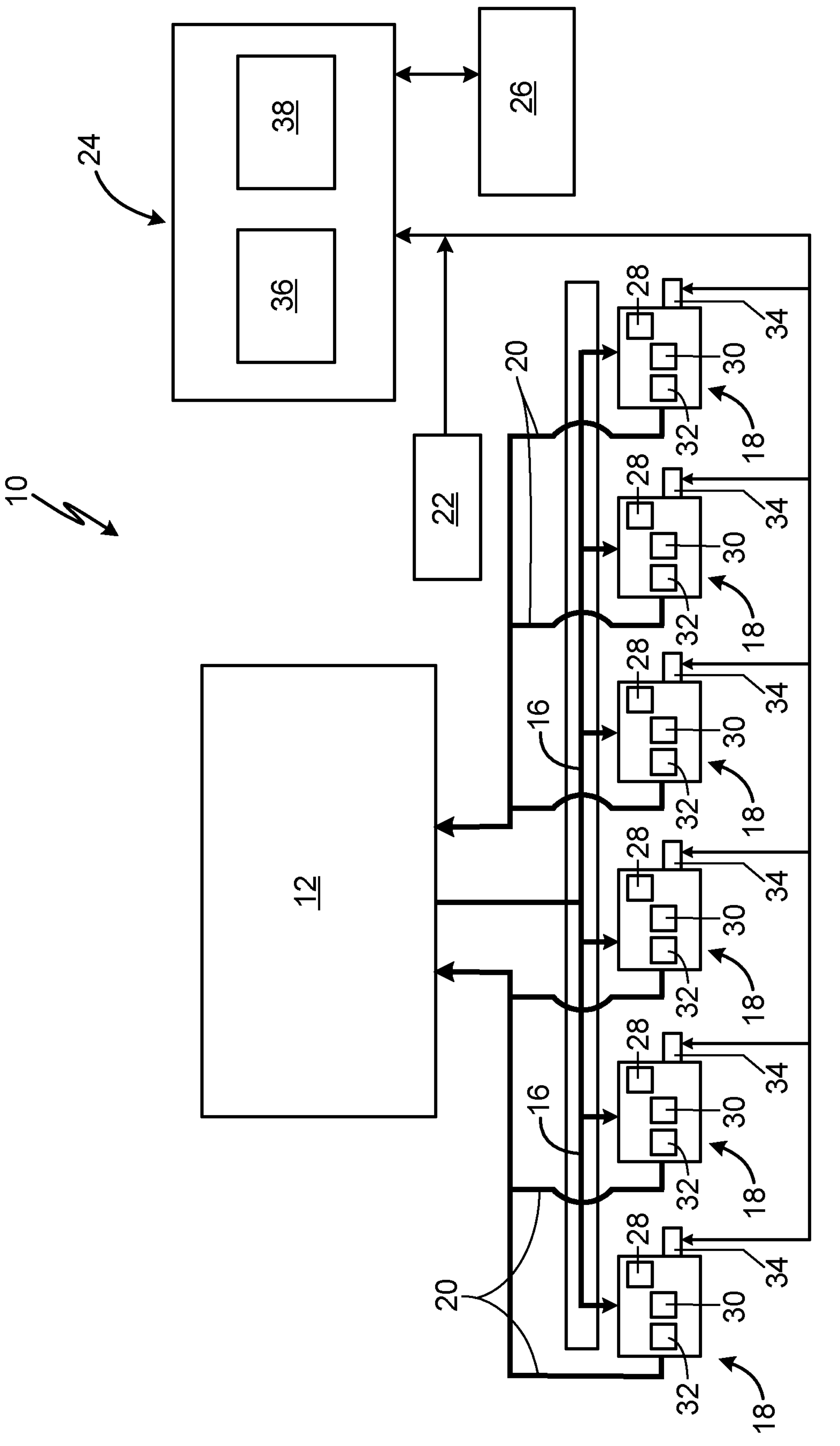
FIG. 1 is a block schematic diagram of a spray system.

FIG. 1 is a block schematic diagram of spray system 10. Spray system 10 includes supply tank 12, booms 14, distribution lines 16, nozzles 18, bleed lines 20, system sensors 28, control module 24, and user interface 26. Each nozzle 18 includes sensor(s) 28, spray valve(s) 30, bleed valve 32, and nozzle controller 34. Control module 24 includes control circuitry 36 and memory 38.

Spray system 10 is configured to apply liquid sprays onto a target surface via nozzles 18. For example, spray system 10 can be configured as part of an agricultural spraying system configured to apply liquid sprays to fields. Spray system 10 can be configured to apply herbicides, pesticides, fungicides, and liquid fertilizers, among other options. In some examples, spray system 10 can be integrated into a self-propelled agricultural sprayer. In other examples, spray system 10 can be attached to and towed by another agricultural implement. While spray system 10 is described as implemented in an agricultural sprayer, it is understood that spray system 10 can be operated according to the techniques described herein in multiple environments and across a variety of applications. System sensors 22 are configured to generate data regarding spray system 10 during operation. For example, system sensors 22 can be configured to generate any one or more of geo-positioning data, ground speed data, and wheel deflection data, among other types of data.

Control module 24 is configured to generate and provide spray commands to nozzles 18 to cause nozzles 18 to emit liquid sprays according to the commanded application rate and droplet size. Control module 24 can be configured to provide individual commands to each nozzle 18. For example, control module 24 can generate individual spray commands for each nozzle 18 and communicate each individual spray command to each nozzle controller 34 to thereby control the spray parameters of the liquid spray emitted by each nozzle 18. In one example, the spray commands cause each nozzle 18 to emit a liquid spray having a specified droplet size at a specified application rate. The spray command can be based on any desired input parameter. For example, a prescription map for a field can be stored in memory 38 of control module 24, and control module 24 can generate the spray commands based on the prescription map. Control module 24 can be configured to generate the spray commands based on geo-positioning data. For example, system sensors 22 can include a geo-positioning receiver communicatively linked to control module 24. Control module 24 can be configured to generate commands based on based on location data from GPS (Global Positioning System), GNSS (Global Navigation Satellite System), GPS/RTK (GPS/Real Time Kinematic), or equivalent systems.

Control module 24 can be of any suitable configuration for controlling operation of components of spray system 10, gathering data, processing data, etc. For example, control module 24 can generate spray commands, send the spray commands to nozzles 18, and receive data from nozzles 18. As such, control module 24 can be of any type suitable for operating in accordance with the techniques described herein. In some examples, control module 24 can be implemented as a plurality of discrete circuitry subassemblies. In some examples, control module 24 can be integrated with the control system for the agricultural implement. In other examples, control module 24 can be separate from and in communication with the control system of the agricultural implement.

Control circuitry 36 is configured to implement functionality and/or process instructions. Control circuitry 36 can include one or more processors, configured to implement functionality and/or process instructions. For example, control circuitry 36 can be capable of processing instructions stored in memory 38. Examples of control circuitry 36 can include any one or more of a microprocessor, a controller, a digital signal processor (DSP), an application specific integrated circuit (ASIC), a field-programmable gate array (FPGA), or other equivalent discrete or integrated logic circuitry.

In some examples, control circuitry 36 can include communications circuitry configured to facilitate wired or wireless communications. For example, the communications circuitry can facilitate radio frequency communications and/or can facilitate communications over a network, such as a local area network, wide area network, and/or the Internet.

Memory 38, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 38 is a temporary memory, meaning that a primary purpose of memory 38 is not long-term storage. Memory 38, in some examples, is described as volatile memory, meaning that memory 38 does not maintain stored contents when power to spray system 10 is turned off. Examples of volatile memories can include random access memories (RAM), dynamic random access memories (DRAM), static random access memories (SRAM), and other forms of volatile memories. In some examples, memory 38 is used to store program instructions for execution by control circuitry 36. For example, memory 38 can store instructions that, when executed by control circuitry 36, cause control module 24 to generate spray commands Memory 38, in one example, is used by software or applications running on control circuitry 36 to temporarily store information during program execution.

Memory 38, in some examples, also includes one or more computer-readable storage media. Memory 38 can be configured to store larger amounts of information than volatile memory. Memory 38 can further be configured for long-term storage of information. In some examples, memory 38 includes non-volatile storage elements. For example, spray system 10 can include non-volatile storage elements such as flash memories or forms of electrically programmable memories (EPROM) or electrically erasable and programmable (EEPROM) memories. In some examples, memory 38 can be external and can be received in a memory card slot of spray system 10. For example, memory 38 can be an external hard drive, flash drive, memory card, secure digital (SD) card, micro SD card, or other such device.

User interface 26 can be any graphical and/or mechanical interface that enables user interaction with control module 24. For example, user interface 26 can implement a graphical user interface displayed at a display device of user interface 26 for presenting information to and/or receiving input from a user. User interface 26 can include graphical navigation and control elements, such as graphical buttons or other graphical control elements presented at the display device. User interface 26, in some examples, includes physical navigation and control elements, such as physically-actuated buttons or other physical navigation and control elements. In general, user interface 26 can include any input and/or output devices and control elements that can enable user interaction with control module 24. In some examples, user interface 26 can be integrated into a cab of an agricultural spraying implement.

Supply tank 12 stores a supply of liquid for spraying. Supply tank 12 can be mounted to a frame and/or supported by a surface. For example, supply tank 12 can be mounted to the frame of the agricultural spraying implement and/or supported by the bed of a truck or other vehicle. Spray system 10 can include a motive device of any desired configuration for driving the liquid through distribution lines 16. For example, supply tank 12 can be pressurized and/or a pump can be disposed to pump the liquid from supply tank 12 through distribution lines 16 to nozzles 18.

Distribution lines 16 are fluidly connected to supply tank 12 to receive liquid from supply tank 12. Distribution lines 16 can be of any configuration suitable for conveying the liquid from supply tank 12 to nozzles 18. Distribution lines 16 can be tubular supply manifolds that project from an agricultural spraying implement. Distribution lines 16 can be supported by boom 14 that projects laterally from the implement relative to a direction of travel of the implement. The booms 14 can be employed as a single structure or multiple structures supported by the body of the agricultural spraying implement. For example, boom 14 can have two structural sections extending laterally from opposite sides of the implement. In some examples, multiple nozzles 18 can be connected to a common distribution line 16 such that the distribution line 16 feeds each of the multiple nozzles 18. In other examples, distribution lines 16 can include multiple individual flow tubes extending to nozzles 18. In one example, spray system 10 can include the same number of flow tubes as nozzles 18.

Nozzles 18 are mounted on distribution lines 16 to receive the liquid from distribution lines 16 and to expel the liquid as a spray. Nozzles 18 generate liquid sprays for application on the target surface, such as application in a field. Each nozzle 18 is configured to direct a spray portion of the liquid received from distribution line 16 through a spray outlet of that nozzle 18. Each nozzle 18 is further configured to direct a bleed portion of the liquid received from distribution line 16 through bleed line 20.

Bleed lines 20 are fluidly connected to supply tank 12 and are configured to route the bleed portion from each nozzle 18 to supply tank 12. In one example, each bleed line 20 extends to supply tank 12. In another example, multiple bleed lines 20 extend to and are fluidly connected with a common return line that directs the bleed portions back to supply tank 12. It is understood that spray system 10 can include as many or as few return lines as desired.

Sensors 28 are configured to generate spray data regarding nozzle 18. The spray data can include one or more of valve position information and liquid parameter information. Sensors 28 can include one or more sensors of various configurations. For example, sensors 28 can include valve sensors associated with spray valves 30 and/or bleed valves 32 and configured to generate the valve position information. Sensors 28 can further includes parameter sensors configured to generate the liquid parameter information. Each nozzle 18 can include multiple sensors 28 of different types. For example, nozzle 18 can include both valve sensors configured to generate valve position information and parameter sensors configured to generate liquid parameter information. Sensors 28 are configured to provide the spray data to control module 24 and/or nozzle controller 34.

The valve position information includes information related to the positioning of components of spray valves 30 and bleed valves 32. For example, one or both of spray valves 30 and bleed valves 32 can be actuated by a stepper motor, and the valve position information can be a step count. In other examples, sensor 28 can be a transducer, such as a linear transducer, configured to sense displacement of the valve member of spray valve 30 and/or bleed valve 32. It is thus understood that each nozzle 18 can include the same number of valve sensors as spray valves 30 and/or bleed valves 32.

The liquid parameter information includes information relating to the liquid flowing through nozzle 18. For example, the liquid parameter information can include the volumetric flow of the liquid and/or the pressure of the liquid flowing through nozzle 18, among other options. Sensor 28 can thus include one or more flow sensors configured to sense liquid flow rates, can include one or more pressure sensors configured to sense liquid pressures, or can be of any other type suitable for generating liquid parameter information.

In some examples, sensors 28 can also include spray fan sensors. For example, a sensor 28 can be configured to sense the presence of the spray fan emitted from nozzle 18 and characteristics of that spray fan, such as fan width droplet size. The spray fan sensor 28 can generate and provide spray fan information to one or both of nozzle controller 34 and control module 24.

Spray valve 30 and bleed valve 32 are disposed in nozzle 18 and are configured to control the spray characteristics of the liquid spray emitted by nozzle 18. Spray valve 30 and bleed valve 32 are controlled in tandem to control both the flow rate and pressure at the spray outlet, which flow rate and pressure affect the spray characteristics. Spray valve 30 and bleed valve 32 are actively controlled during operation. A flowpath extends through each nozzle from distribution line 16 to a spray outlet. The flowpath splits into a bleed path and a spray path within nozzle 18. The bleed path directs the bleed portion to bleed line 20, and the spray path directs the spray portion to the spray outlet.

Bleed valve 32 is disposed in nozzle 18 and is configured to control flow of the bleed portion of the liquid from the common flowpath to bleed line 20. Bleed valve 32 is capable of being actuated to a variety of open positions, with each of the open positions corresponding to a different flow path size through nozzle 18 to bleed line 20. The positioning of bleed valve 32 controls the liquid flow rate through bleed line 20 and to supply tank 12. In one example, bleed valve 32 is an annular valve. It is understood, however, that bleed valve 32 can be of any type suitable for controlling flow through bleed line 20, such as a needle valve, disk valve, or ball valve, among other options. Bleeding some of the liquid flow through nozzle 18 reduces the flow rate and the spray outlet.

Spray valve 30 is disposed in nozzle 18 and configured to control flow of the spray portion of the liquid from distribution line 16 to the spray outlet of nozzle 18. In some examples, each nozzle 18 can include multiple spray valves controlling the flow of liquid. For example, a first spray valve 30 can be disposed upstream of the intersection between the bleed path and the spray path and a second spray valve 30 can be disposed in the spray path downstream of the intersection between the bleed path and the spray path. The first spray valve 30 can control the liquid flow to each of bleed valve 32 and a second spray valve 30, while the second spray valve 30 can control flow of the spray portion. For example, the second spray valve 30 can be disposed at the spray outlet to control the characteristics of the spray outlet. As such, the first spray valve 30 can control the dimensions of a flowpath through the body of nozzle 18 and the second spray valve 30 can control the configuration of the orifice through which the liquid is ejected as a spray.

While nozzle 18 is described as including multiple spray valves 30, it is understood that nozzle 18 can include a single spray valve. For example, the single spray valve 30 can be disposed in the flowpath through nozzle 18 upstream of the location where the flowpath splits into the bleed path and the spray path. As such, the liquid can flow through spray valve 30 prior to encountering bleed valve 32. In another example, the single spray valve 30 can be disposed on the spray path downstream of the location where the flowpath splits into the bleed path and the spray path.

Spray valve 30 can be actuated to any desired position to generate the liquid spray having the desired flow rate and droplet size. In examples where nozzle 18 includes multiple spray valves 30, it is understood that the spray valves 30 can all be of the same configuration or can be of differing configurations. In examples where nozzle 18 includes multiple spray valves 30, the spray valves 30 can be individually controlled to generate a spray having the desired flow rate and droplet size. In one example, one or more of the spray valves 30 include annular valves. It is understood, however, that spray valve 30 can be of any type suitable for controlling flow, such as a needle valve, disk valve, or ball valve, among other options.

In one example, each of bleed valve 32 and spray valve 30 include an annular valve. An annular spray valve 30 can be disposed on the flowpath upstream of the intersection between the bleed line and the spray line. An annular bleed valve 32 can be a second annular valve controlling flow of the bleed portion. The annular spray valve 30 controls flow of the liquid into nozzle 18 from distribution line 16. The annular bleed valve 32 control flow of the bleed portion to bleed line 20. The annular spray valve 30 and annular bleed valve 32 can be controlled in tandem to control the flow parameters of the spray portion of the liquid. Controlling the annular spray valve 30 and the annular bleed valve 32 in tandem allows the spray system to control both the pressure and the flow rate of the spray portion flowing to the spray outlet.

Nozzle controller 34 is integrated into nozzle 18. Nozzle controller 34 is configured to actuate spray valve 30 and bleed valve 32 based on spray commands from control module 24, the state of spray system 10, and feedback from sensors 28. Nozzle controller 34 is configured to cause spray valve 30 and bleed valve 32 to actuate to positions such that the spray portion of the liquid is emitted from nozzle 18 at a desired application rate and droplet size. Nozzle controller 34 actively controls the positioning of each of bleed valve 32 and spray valve 30 based the liquid parameter information from sensor 28, thereby ensuring that nozzle 18 emits liquid according to the spray command Nozzle controller 34 can be of any type suitable for controlling actuation of valve 26 based on commands from control module 24 and/or on spray data from sensor 28. Nozzle controller 34 can include control circuitry and memory. For example, nozzle controller 34 can include a microprocessor, a controller, a digital signal processor (DSP), an application specific integrated circuit (ASIC), a field-programmable gate array (FPGA), or other equivalent discrete or integrated logic circuitry.

The application rate is a product of both the flow rate of the liquid in nozzle 18 and the speed of nozzle 18 relative to the surface being sprayed (i.e., the relative ground speed of nozzle 18). Nozzle controller 34 can be configured to determine the relative ground speed of nozzle 18 based on the location of nozzle 18 on distribution line 16 and on the ground speed of spray system 10. For example, system sensors 22 can include ground speed sensors, such as speed sensors incorporating geo-positioning receivers. In one example, the ground speed sensors can be disposed at opposite ends of distribution lines 16. Nozzle controller 34 can determine the relative speed of its nozzle 18 based on the location of its nozzle 18 along distribution line 16 and the ground speed each end of distribution line 16. It is understood, however, that system sensors 22 can include any type of sensor suitable for generating the ground speed data. Nozzle controller 34 can be configured to determine the relative ground speed of nozzle 18 according to any suitable technique. Nozzle controller 34 can alter the positions of bleed valve 32 and spray valve 30 based on the relative ground speed to emit the spray at the desired application rate.

It is understood that the desired droplet size can include a spray consisting of a skewed distribution of multiple droplet sizes that are characterized by a representative diameter (e.g., a volume median diameter (DV0.5)) or in relation to droplet size categories (e.g., as defined by American Society of Agricultural and Biological Engineers ASABE S-572.1). As such, the desired droplet size can be understood as a representative diameter and/or based on a standardized category.

During operation, system 10 generates liquid sprays and applies the liquid sprays to a target surface. In one example, spray system 10 is an agricultural spray system that is traversed over a field and applies sprays of agricultural liquid to the field. The liquid flows through distribution lines 16 to nozzles 18 at a pressure generated by the motive device, such as a pump, associated with supply tank 12.

Control module 24 generates spray commands and transmits the spray commands to nozzles 18 to cause nozzles 18 to emit liquid sprays according to the commanded application rate and droplet size. The spray command is received by nozzle controller 34. For each nozzle 18, nozzle controller 34 actuates spray valve 30 to a spray position and bleed valve 32 to a bleed position associated with the first application rate and first droplet size based on the spray command Sensors 28 generate spray data, including valve position information based on the positions of bleed valve 32 and spray valve 30 and liquid parameter information based on the flow and pressure of the liquid through nozzle 18. The actuation of bleed valve 32 is sensed by a sensor 28 associated with bleed valve 32. The actuation of spray valve 30 is sensed by a sensor 28 associate with spray valve 30. Sensors 28 generate valve position information based on actuation state of bleed valve 32 and spray valve 30. The valve position information provides the position to which valve 26 is actuated based on the spray command Other ones of sensors 28, such as one or more flow meters and pressure sensors, sense parameters of the liquid flowing through nozzle 18 and generate liquid parameter information. Sensors 28 can transmit the spray data, including valve position information and liquid parameter information, to control module 24 and/or nozzle controller 34.

The positions of bleed valve 32 and spray valve 30 are actively controlled to ensure that the liquid spray has the desired spray characteristics. Varying the position of spray valve 30 changes the size of the restriction associated with spray valve 30. Varying the size of the restriction controls the pressure drop and flow rate through spray valve 30. In examples where a spray valve 30 is disposed upstream of the location where the flowpath splits into the bleed path and the spray path, spray valve 30 controls the flow rate and pressure at the intersection.

Bleed valve 32 provides additional flow control for nozzle 18. Actuating bleed valve 32 to an open state directs the bleed portion of the liquid back to supply tank 12 through bleed line 20. Bleeding the bleed portion out of nozzle 18 decreases the flow rate at the spray outlet of nozzle 18. As such, bleed valve 32 can be actively controlled to ensure that the spray portion of the liquid has the desired flow rate.

For example, the liquid entering nozzle 18 from distribution line 16 can have a first flow rate and pressure, such as 125 cubic centimeters per second (cm^3/s) (about 2 gallons/minute) flow rate and a pressure of 0.5 megapascal (MPa) (about 75 pounds per square inch (psi)). A first spray valve 30 can be disposed upstream of the intersection between the bleed path and the spray path. Nozzle controller 34 and/or control module 24 actuate the first spray valve 30 to a desired position to control the pressure and flow rate of the liquid downstream of the first spray valve 30. For example, the first spray valve 30 can be positioned to create a desired pressure drop. Bleed valve 32 is actuated to a desired position to reduce the flow rate at the spray outlet of nozzle 18. For example, where the application rate calls for a flow of 1.5 gallons/minute, bleed valve 32 can be positioned to direct 0.5 gallons/minute to bleed line 20. The remaining 1.5 gallons/minute proceed through the spray portion of the flowpath in nozzle 18 and is ejected through the spray outlet.

The positions of bleed valve 32 and each spray valve 30 can be continuously changed during operation to ensure the spray fan has the desired spray characteristics. For example, as the agricultural spray implement slows or speeds up the nozzles 18 need to eject liquid at a lower flow rate or higher flow rate to ensure that the liquid is applied at the desired application rate. Nozzle controller 34 can actuate bleed valve 32 to change the size of the flowpath through bleed valve 32, thereby changing the flow rate at the spray outlet of nozzle 18. In one example, as the agricultural implement turns, some nozzles 18 will speed up relative to the ground surface and some nozzles 18 will slow down relative to the ground surface. In the nozzles 18 that speed up, bleed valve 32 can be actuated to a more closed state, narrowing the flowpath through bleed valve 32 and increasing the flow rate at the spray outlet. In the nozzles 18 that slow down, bleed valve 32 can be actuated to a more open state, widening the flowpath through bleed valve 32 and decreasing the flow rate at the spray outlet.

Spray system 10 provides significant advantages. Each nozzle 18 includes bleed valve 32 that controls the flow of a bleed portion of the liquid back to supply tank 12. As such, the liquid is continuously circulating within spray system 10. In addition, bleed valve 32 provides additional control over the characteristics of the spray emitted by nozzle 18. The position of the bleed valve 32 can be controlled to discretely alter the characteristics of the spray portion. Some nozzles 18 can include a first spray valve 30 disposed upstream of the intersection between the bleed line and the spray line and a second spray valve 30 disposed downstream of the intersection. The first spray valve 30 can affect both the pressure and flow rate of the liquid flowing to the intersection. Bleed valve 32 is controlled to take off the bleed portion of that liquid and the second spray valve 30 controls spraying of the liquid. The first spray valve 30 and bleed valve 32 can be controlled in tandem to ensure a desired pressure and flow rate at the second spray valve 30. Moreover, each of spray valve 30 and bleed valve 32 can include annular valves. Annular valves provide discrete control over pressure and flow through the valve. As such, annular valves provide greater control over the spray characteristics, allowing for finer adjustment during spraying. Further, nozzle controller 34 and/or control module 24 can individually control each of spray valve 30 and bleed valve 32. Individually controlling each spray valve 30 and bleed valve 32 provides for finer spray control, ensuring that the spray is applied at the desired application rate and droplet size. Both the application rate and droplet size affect the effectiveness of the applied liquid.

Figure 2:
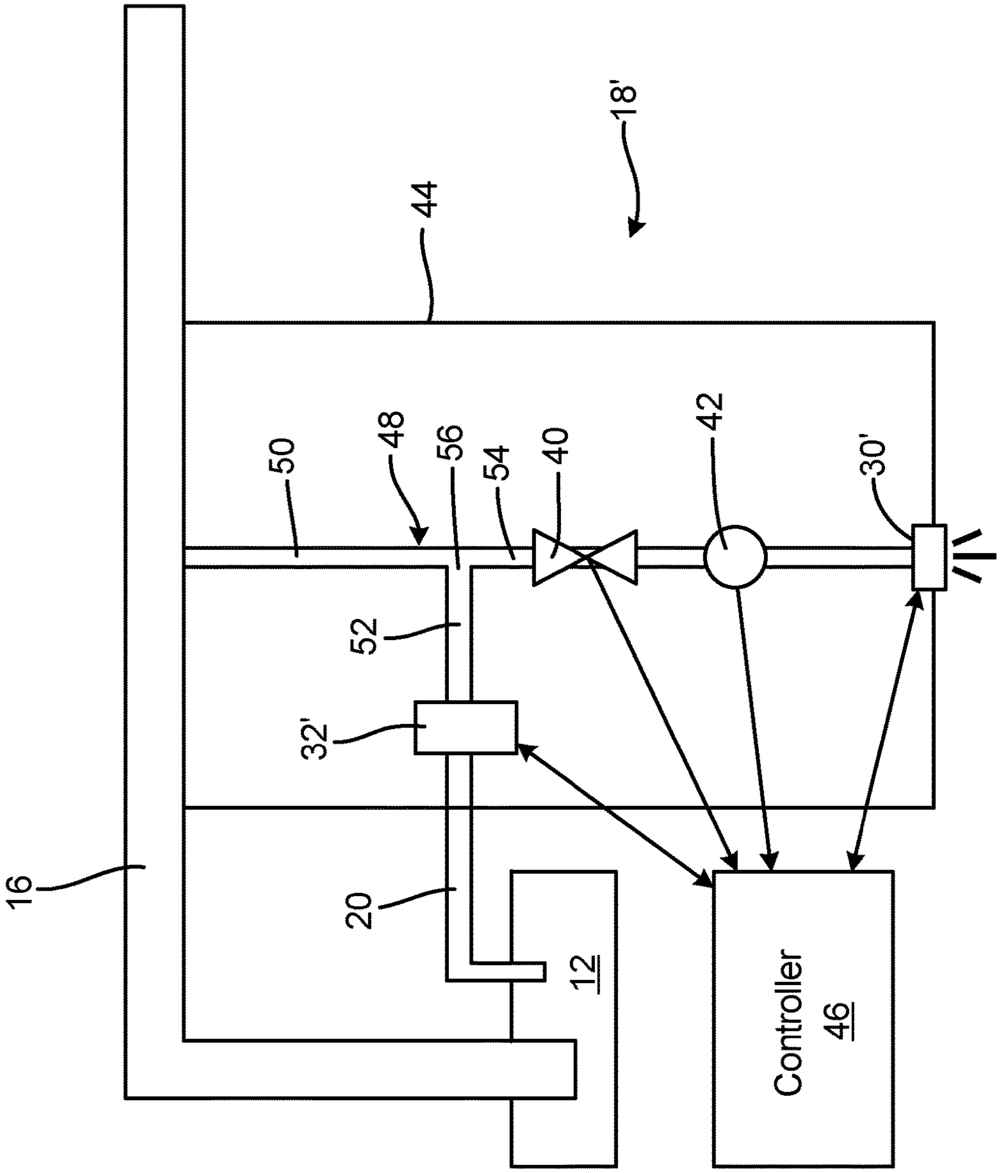
FIG. 2 is a schematic block diagram of a spray nozzle.

FIG. 2 is a block schematic diagram of nozzle 18'. Nozzle 18' includes orifice valve 30', bleed valve 32', flow meter 40, pressure sensor 42, nozzle body 44, and controller 46. Nozzle body 44 includes flowpath 48. Flowpath 48 includes inlet path 50, bleed path 52, spray path 54, and intersection 56. Supply tank 12, distribution line 16, and bleed line 20 of spray system 10 (FIG. 1) are shown.

Nozzle 18' is substantially similar to nozzle 18 (FIG. 1) and can be operated in accordance with techniques described herein. Controller 46 is substantially similar to nozzle controller 34 (FIG. 1) and/or control module 24 (FIG. 1) and can be operated in accordance with techniques described herein. Controller 46 can be dedicated to nozzle 18', similar to nozzle controller 34, or configured as a system wide controller, similar to control module 24.

Nozzle 18' is mounted to distribution line 16 to receive liquid from distribution line 16. Distribution line 16 is fluidly connected to supply tank 12 to receive liquid from supply tank 12. Nozzle body 44 can be attached to distribution line 16 in any desired manner, such as by a mounting clamp. Flowpath 48 extends through nozzle body 44 to provide a flow passage for the liquid to flow through nozzle body 44. Inlet path 50 receives the liquid from distribution line 16 and extends to intersection 56. Bleed path 52 extends from intersection 56 and provides a flowpath for a bleed portion of the liquid to exit nozzle 18' without being applied as a spray. Bleed line 20 extends from nozzle body 44 to supply tank 12 and is configured to route the bleed portion back to supply tank 12. Spray path 54 extends from intersection 56 to orifice valve 30'. Spray path 54 provides a flowpath for a spray portion of the liquid to flow to orifice valve 30' to be applied as a liquid spray.

Bleed valve 32' is disposed in nozzle body 44 on bleed path 52. Bleed valve 32' is configured to control flow of the bleed portion of the liquid through bleed path 52. Bleed valve 32' is communicatively connected to controller 46 to receive commands from controller 46 and provide feedback to controller 46. For example, bleed valve 32' can include a position sensor, such as sensor 28 (FIG. 1), that generates information regarding the position of components of bleed valve 32' and provides that information to controller 46. In one example, bleed valve 32' is actuated by a stepper motor, such that the positional feedback can be a step count from the stepper motor. Bleed valve 32' is an actively controlled valve such that the dimensions of the flow path through bleed valve 32' can be continuously adjusted during operation. Bleed valve 32' can be of any configuration suitable for actively controlling flow of the bleed portion to bleed line 20. For example, bleed valve 32' can be an annular valve or a needle valve, among other options.

Orifice valve 30' is disposed in nozzle body 44 on spray path 54. In the example shown, orifice valve 30' is disposed at the spray outlet of nozzle 18'. Orifice valve 30' controls the configuration of the spray orifice at the spray outlet. Orifice valve 30' is communicatively coupled to controller 46 to receive commands from controller 46 and provide feedback to controller 46. For example, orifice valve 30' can include a position sensor, such as sensor 28, that generates information regarding the position of components of orifice valve 30' and provides that information to controller 46. In one example, orifice valve 30' is actuated by a stepper motor, such that the positional feedback can be a step count from the stepper motor. Orifice valve 30' is an actively controlled valve such that the flow path through orifice valve 30' can be continuously adjusted during operation.

Flow meter 40 is disposed on spray path 54 downstream of intersection 56. Flow meter 40 is configured to sense the flow rate of the spray portion of the liquid flowing through spray path 54. Flow meter 40 provides the liquid flow information to controller 46. Flow meter 40 can be of any type suitable for sensing the liquid flow through spray path 54. For example, flow meter 40 can be a cyclonic meter or a gear meter, among other options.

Pressure sensor 42 is disposed on spray path 54 downstream of intersection 56. Pressure sensor 42 is configured to sense the pressure of the liquid flowing through spray path 54. Pressure sensor 42 provides the liquid flow information to controller 46. Pressure sensor 42 can be of any type suitable for sensing the liquid pressure in spray path 54.

During operation, liquid is driven from supply tank 12 to nozzle 18' through distribution line 16. The liquid enters flowpath 48 and flows through inlet path 50 portion of flowpath 48 to intersection 56. Bleed valve 32' controls the flow of a bleed portion of the liquid through bleed path 52 to bleed line 20. Bleed valve 32' can initially be in a closed state such that bleed valve 32' prevents the any liquid from flowing back to supply tank 12 through bleed line 20. While bleed valve 32' is shown as disposed downstream from intersection 56, it is understood that bleed valve 32' can be disposed at or near intersection 56 such that no part or a minimal part of bleed line 20 is disposed upstream of bleed valve 32'. A spray portion of the liquid flows through spray path 54 to orifice valve 30'. With orifice valve 30' in an open state the liquid is ejected through the spray outlet of nozzle 18' as a liquid spray.

Flow meter 40 senses the flow rate of the liquid in spray path 54 and provides liquid flow data to controller 46. Pressure sensor 42 sense the pressure of the liquid in spray path 54 and provides liquid pressure data to controller 46. Controller 46 is configured to actively control spraying from nozzle 18' such that the liquid spray is applied at a desired application rate with a desired droplet size. Controller 46 can determine the application rate and the droplet size based on the liquid flow data, the liquid pressure data, and the position of orifice valve 30'.

Spraying can be initiated by controller 46 providing commands to bleed valve 32' and orifice valve 30' to cause bleed valve 32' and orifice valve 30' to actuate to open positions. With bleed valve 32' open, the bleed portion of the liquid flows through bleed path 52 to bleed line 20 and back to supply tank 12. With orifice valve 30' open, the spray portion of the liquid flows through spray path 54 and out of the spray outlet of nozzle 18'.

Controller 46 can actively control each of bleed valve 32' and orifice valve 30' throughout operation to ensure a consistent spray. For example, if a reduction in the flow through spray path 54 is needed, controller 46 can cause bleed valve 32' to increase the opening through bleed valve 32'. Increasing the opening bleed valve 32' increases the size of the flowpath through bleed valve 32', thereby allowing a greater portion of the liquid entering flowpath 48 to be bled back to supply tank 12 as the bleed portion. If an increase in the flow through spray path 54 is needed, controller 46 can cause bleed valve 32' to reduce the opening through bleed valve 32'. Reducing the opening decreases the size of the flowpath, thereby restricting flow of the bleed portion such that a smaller portion of the liquid entering flowpath 48 is bled back to supply tank 12. The bleed portion can mix with the liquid in supply tank 12. As such, the bleed portion can be recirculated through distribution line 16 and back to a nozzle 18'.

Figure 3:
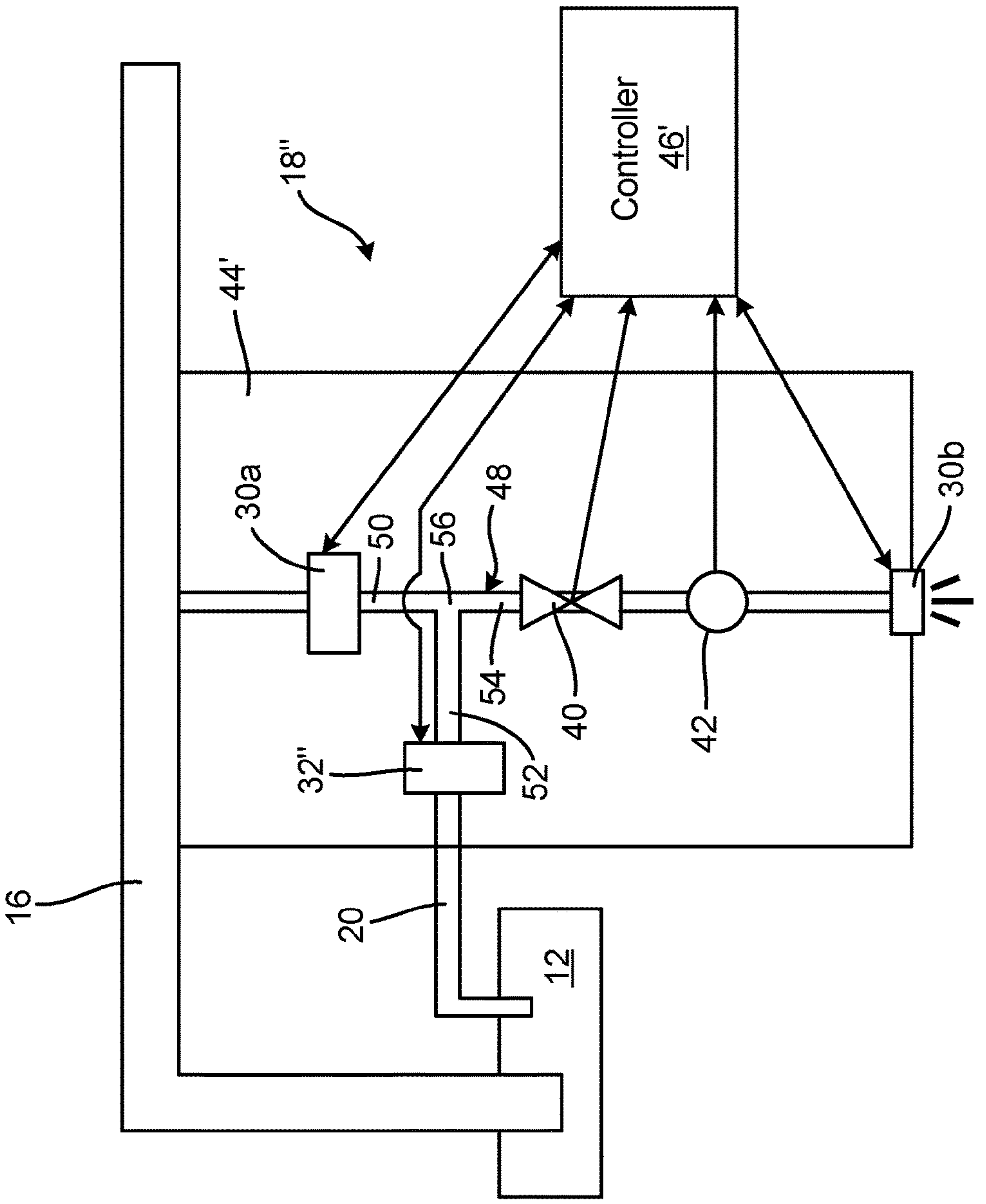
FIG. 3 is a schematic block diagram of a spray nozzle.

FIG. 3 is a block schematic diagram of nozzle 18". Nozzle 18" includes spray valve **30*a*, orifice valve 30*b*, bleed valve 32", flow meter 40, pressure sensor 42, nozzle body 44', and controller 46'. Nozzle body 44' includes flowpath 48. Flowpath 48 includes inlet path 50, bleed path 52, spray path 54, and intersection 56. Supply tank 12, distribution line 16, and bleed line 20 of spray system 10 (FIG. 1**) are shown.

Nozzle 18" is substantially similar to nozzle 18 (FIG. 1) and nozzle 18" (FIG. 2) and can be operated in accordance with techniques described herein. Controller 46' is substantially similar to nozzle controller 34 (FIG. 1), control module 24 (FIG. 1), and/or controller 46 (FIG. 2) and can be operated in accordance with techniques described herein. Controller 46' can be dedicated to nozzle 18', similar to nozzle controller 34, or configured as a system wide controller, similar to control module 24.

Nozzle 18" is mounted to distribution line 16 to receive liquid from distribution line 16. Distribution line 16 is fluidly connected to supply tank 12 to receive liquid from supply tank 12. Nozzle body 44' can be attached to distribution line 16 in any desired manner, such as by a mounting clamp. Flowpath 48 extends through nozzle body 44' to provide a flow passage for the liquid to flow through nozzle body 44'. Inlet path 50 receives the liquid from distribution line 16 and extends to intersection 56. Bleed path 52 branches from flowpath 48 at intersection 56 and is configured to provide a pathway for a bleed portion of the liquid to exit nozzle 18" without being applied as a spray. Bleed line 20 extends from nozzle body 44' to supply tank 12 and is configured to route the bleed portion back to supply tank 12. Spray path 54 extends from intersection 56 to orifice valve **30*b*. Spray path 54 is configured to provide a pathway for a spray portion of the liquid to flow to orifice valve 30*b*** to be applied as a liquid spray.

Bleed valve 32" is disposed in nozzle body 44' on bleed path 52. Bleed valve 32" is substantially similar to bleed valve 32 (FIG. 1) and bleed valve 32' (FIG. 2). Bleed valve 32" is configured to control flow of the bleed portion of the liquid through bleed path 52. Bleed valve 32" is communicatively connected to controller 46' to receive commands from controller 46' and provide feedback to controller 46'. For example, bleed valve 32" can include a position sensor, such as sensor 28 (FIG. 1), that generates information regarding the position of components of bleed valve 32" and provides that information to controller 46'. In one example, bleed valve 32" is actuated by a stepper motor, such that the positional feedback can be a step count from the stepper motor. Bleed valve 32" is an actively controlled valve such that the flow path through bleed valve 32" can be continuously adjusted during operation. Bleed valve 32" can be of any configuration suitable for actively controlling flow of the bleed portion to bleed line 20. For example, bleed valve 32" can be an annular valve or a needle valve, among other options.

Orifice valve **30*b* is disposed in nozzle body 44' on spray path 54. Orifice valve 30*b* is substantially similar to spray valve 30 (FIG. 1) and orifice valve 30' (FIG. 2). In the example shown, orifice valve 30*b* is disposed at the spray outlet of nozzle 18". Orifice valve 30*b* is configured to define the dimensions of the spray orifice at the spray outlet. Orifice valve 30*b* is communicatively coupled to controller 46' to receive commands from controller 46' and provide feedback to controller 46'. For example, orifice valve 30*b* can include a position sensor, such as sensor 28, that generates information regarding the position of components of orifice valve 30*b* and provides that information to nozzle controller 46'. In one example, orifice valve 30*b* is actuated by a stepper motor, such that the positional feedback can be a step count from the stepper motor. Orifice valve 30*b* is an actively controlled valve such that the flow path through orifice valve 30*b*** can be continuously adjusted during operation.

Flow valve **30*a* is disposed in nozzle body 44' on inlet path 50. Flow valve 30*a* is substantially similar to spray valve 30 (FIG. 1). Flow valve 30*a* is disposed upstream of intersection 56. Flow valve 30*a* is configured to control the flow of liquid downstream through flowpath 48. As such, flow valve 30*a* controls all liquid flow to intersection 56 from distribution line 16. Flow valve 30*a* is communicatively connected to controller 46' to receive commands from controller 46' and provide feedback to controller 46'. For example, flow valve 30*a* can include a position sensor, such as sensor 28, that generates information regarding the position of components of flow valve 30*a* and provides that information to controller 46'. In one example, flow valve 30*a* is actuated by a stepper motor, such that the positional feedback can be a step count from the actuator. Flow valve 30***a* is an actively controlled valve such that the flow path through flow valve 30*a* can be continuously adjusted during operation. Flow valve 30*a* can be of any configuration suitable for actively controlling flow of the liquid into nozzle 18". For example, flow valve 30*a* can be an annular valve or a needle valve, among other options. In one example, each of bleed valve 32" and flow valve 30*a* are annular valves.

Flow meter 40 is disposed on spray path 54 downstream of intersection 56. Flow meter 40 is configured to sense the flow rate of the liquid flowing through spray path 54. Flow meter 40 provides the liquid flow information to controller 46'. Flow meter 40 can be of any type suitable for sensing the liquid flow through spray path 54.

Pressure sensor 42 is disposed on spray path 54 downstream of intersection 56. Pressure sensor 42 is configured to sense the pressure of the liquid flowing through spray path 54. Pressure sensor 42 provides the liquid flow information to controller 46'. Pressure sensor 42 can be of any type suitable for sensing the liquid pressure in spray path 54.

During operation, liquid is driven from supply tank 12 to nozzle 18" through distribution line 16. The liquid enters flowpath 48 and initially encounters flow valve 30*a*. Flow valve 30*a* controls the pressure and flow rate of the liquid flowing downstream through flow valve 30*a* and through inlet path 50 to intersection. Controller 46' provides a command to flow valve 30*a* to cause flow valve 30*a* to actuate to a desired position for spraying. The liquid flows through inlet path 50 to intersection 56. At intersection 56, the bleed portion flows through bleed path 52 and the spray portion flows through spray path 54.

Bleed valve 32" controls the flow of the bleed portion of the liquid through bleed path 52 to bleed line 20. Bleed valve 32" can initially be in a closed state such that bleed valve 32" prevents the any liquid from flowing back to supply tank 12 through bleed line 20. With bleed valve 32" in an open state the bleed portion flows through bleed valve 32" and back to supply tank 12 through bleed line 20. Opening bleed valve 32" reduces the flow rate through spray path 54, due to the bleed portion being bled back to supply tank 12. While bleed valve 32" is shown as disposed downstream from intersection 56, it is understood that bleed valve 32" can be disposed at or near intersection 56 such that no part or a minimal part of bleed line 20 is disposed upstream of bleed valve 32". Orifice valve 30*b* controls spraying of the spray portion of the liquid. With orifice valve 30*b* in an open state the liquid is ejected through the spray outlet of nozzle 18" as a liquid spray.

Flow meter 40 senses the flow rate of the liquid in spray path 54 and provides liquid flow data to controller 46'. Pressure sensor 42 sense the pressure of the liquid in spray path 54 and provides liquid pressure data to controller 46'. Controller 46' is configured to actively control spraying from nozzle 18" such that the liquid spray is applied at a desired application rate with a desired droplet size. Controller 46' can determine the application rate and the droplet size based on the liquid flow data, the liquid pressure data, and the position of orifice valve 30*b*.

Controller 46' provides commands to each of bleed valve 32", orifice valve 30*b*, and flow valve 30*a*. Controller 46' can initiate spraying by causing each of bleed valve 32", orifice valve 30*b*, and flow valve 30*a* to actuate to open positions. With flow valve 30*a* open, the liquid can flow downstream through flow valve 30*a* and through flowpath 48. Flow valve 30*a* controls both the flow rate of the liquid through inlet line 50 and the pressure of the liquid downstream of flow valve 30*a*. As such, the liquid upstream of flow valve 30*a* has a first pressure while the liquid downstream of flow valve 30*a* has a second pressure. The positioning of flow valve 30*a* alters the downstream flow rate and pressure. Opening flow valve 30*a* increases the flow rate downstream of flow valve 30*a* and reduces the pressure drop across flow valve 30*a*. Closing flow valve 30*a* reduces the flow rate downstream of flow valve 30*a* and increases the pressure drop across flow valve 30*a*.

Bleed valve 32" controls flow of the bleed portion through bleed path 52 and to bleed line 20. The positioning of bleed valve 32" affects the parameters of the spray portion flowing through spray path 54 to orifice valve 30*b*. For example, if a reduction in the flow through spray path 54 is needed, controller 46' can cause bleed valve 32" to increase the opening through bleed valve 32". Increasing the opening bleed valve 32" increases the size of the flowpath through bleed valve 32", thereby allowing a greater portion of the liquid entering flowpath 48 to be bled back to supply tank 12 as the bleed portion. If an increase in the flow through spray path 54 is needed, controller 46' can cause bleed valve 32" to reduce the opening through bleed valve 32". Reducing the opening decreases the size of the flowpath, thereby restricting flow of the bleed portion such that a smaller portion of the liquid entering flowpath 48 is bled back to supply tank 12. The bleed portion can mix with the liquid in supply tank 12. As such, the bleed portion can be recirculated through distribution line 16 and back to a nozzle 18".

Orifice valve 30*b* controls the configuration of the spray outlet through which the liquid is emitted to the atmosphere from nozzle 18". The positioning of orifice valve 30*b* affects the characteristics of the spray fan generated by nozzle 18".

Controller 46' controls the opening of each of flow valve 30*a*, orifice valve 30*b*, and bleed valve 32" to cause nozzle 18" to emit a spray having the desired characteristics. For example, controller 46' can cause flow valve 30*a* to actuate to a position associated with a first flow rate and first pressure downstream of flow valve 30*a*. Controller 46' can actuate bleed valve 32" to a position to change the characteristics of the liquid flowing through spray path 54. As such, the flow rate through spray path 54 will be less than the flow rate through flow valve 30*a* with bleed valve 32" in the open state. Controller 46' receives flow rate information from flow meter 40 and pressure information from pressure sensor 42. Controller 46' is configured to control each of orifice valve 30*b*, flow valve 30*a*, and bleed valve 32" to ensure that the liquid has the desired flow rate and pressure at orifice valve 30*b*. As such, controller 46' can actively control each of bleed valve 32", orifice valve 30*b*, and flow valve 30*a* throughout operation to ensure a consistent spray.

Figure 4:
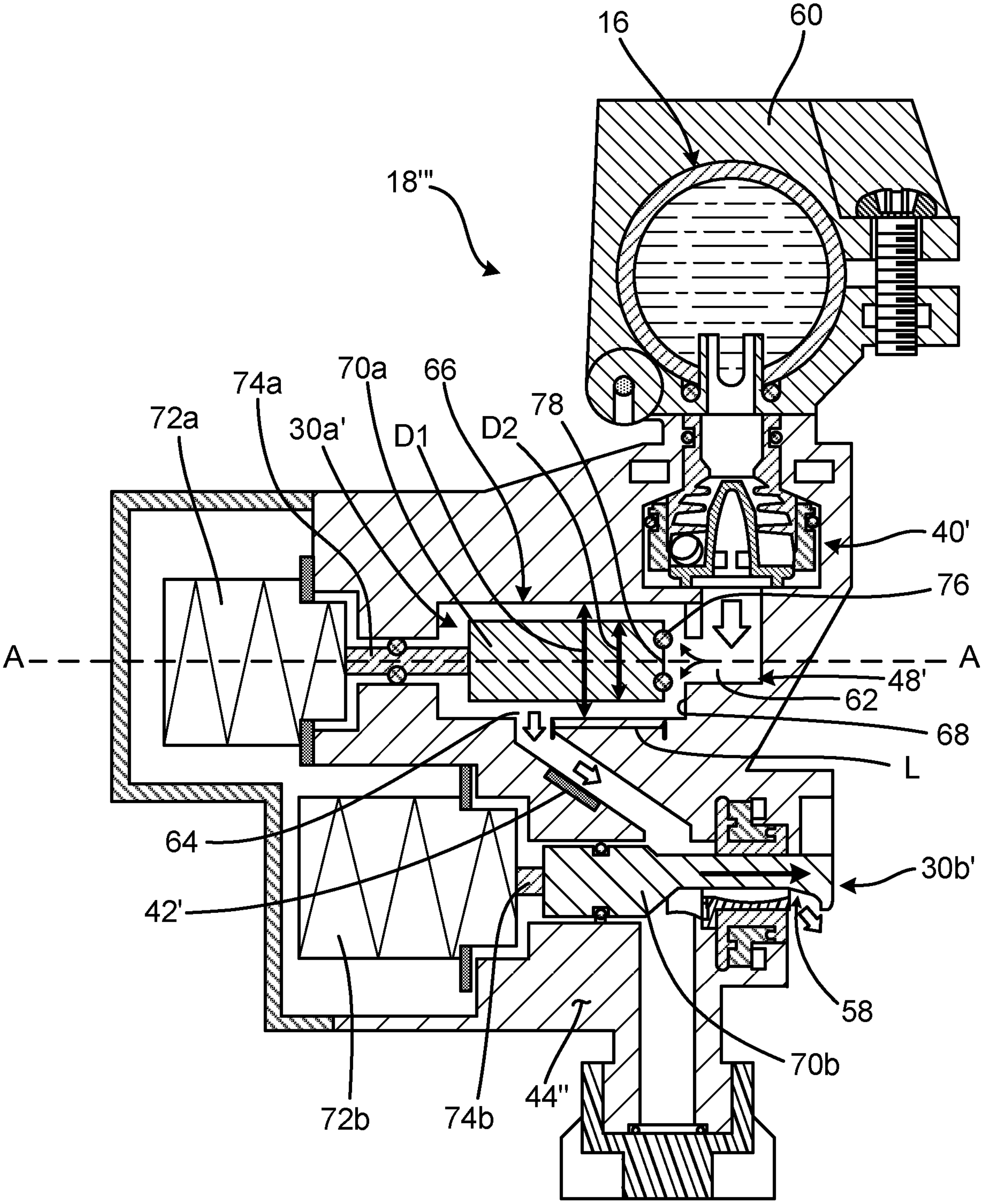
FIG. 4 is a cross-sectional view of a spray nozzle.

FIG. 4 is a cross-sectional view of nozzle 18'". Distribution line 16 of spray system 10 is shown. Nozzle 18'" includes flow valve 30*a*', orifice valve 30*b*', flow meter 40', pressure sensor 42', nozzle body 44', flowpath 48', orifice 58, and mount 60. Flow valve 30*a*' includes inlet 62, outlet 64, valve chamber 66, valve seat 68, valve member 70*a*, actuator 72*a*, arm 74*a*, and seal 76. Valve member 70 includes free end 78. Orifice valve 30*b*' includes valve member 70*b*, actuator 72*b*, and arm 74*b*.

Nozzle 18*i*" is substantially similar to nozzle 18 (FIG. 1), nozzle 18' (FIG. 2), and nozzle 18" (FIG. 3). It is understood that nozzle 18'" can be operated in accordance with the techniques described herein. It is further understood that nozzle 18'" can include a bypass path, such as bleed path 52 (FIGS. 2 and 3), branching from the portion of flowpath 48' disposed between flow valve 30*a*' and orifice valve 30*b*'.

Nozzle 18*i*" is mounted to distribution line 16. Mount 60 is attached to nozzle body 44' and is configured to clamp onto distribution line 16. Flowpath 48' extends through nozzle body 44' to orifice 58. Orifice 58 generates the liquid spray as the liquid exits flowpath 48'.

Flow meter 40' is disposed in nozzle body 44' and is configured to generate volumetric flow data regarding the liquid flowing into nozzle 18'''. In the example shown, flow meter 40' is a cyclonic flow meter having a ball that is rotatably driven by the liquid flowing through the body of flow meter 40'. A sensor senses rotation of the ball about an axis of flow meter 40' and can generate the volumetric flow data based on that rotation. It is understood, however, that flow meter 40' can be of any type suitable for sensing the flow of liquid through flowpath and for generating the volumetric flow data. In addition, while flow meter 40' is shown disposed upstream of flow valve 30*a*', it is understood that flow meter 40' can be disposed in the portion of flowpath 48' between flow valve 30*a*' and orifice valve 30*b*'. As such, flowmeter 40' can be disposed downstream of flow valve 30*a*' and upstream of orifice valve 30*b*'.

Flow valve 30*a*' is mounted to nozzle body 44'. In the example shown, flow valve 30*a*' is an annular valve. Valve chamber 66 is defined by nozzle body 44'. Valve chamber 66 has a first diameter D1. Actuator 72*a* is mounted to nozzle body 44'. In the example shown, actuator 72*a* is an electric stepper motor. The number of steps are counted by a position sensor, such as sensor 28 (FIG. 1), and can be communicated to a controller, such as nozzle controller 28 (FIG. 1), control module 20 (FIG. 1), controller 46 (FIG. 2), and/or controller 46' (FIG. 3). Valve position information for flow valve 30*a*' can be generated based on the step count. While actuator 72*a* is described as an electric stepper motor, it is understood that actuator 72*a* can be of any type suitable for discretely altering the position of valve member 70*a*.

Arm 74*a* extends from actuator 72*a* to valve member 70*a*. In the example shown, arm 74*a* is a shaft driven by actuator 72*a* to adjust the position of valve member 70*a*. It is understood, however, that arm 74*a* can be of any type suitable for actuating valve member 70*a*. Actuator 72*a* can be configured to drive arm 74*a* either linearly or rotatably.

Valve member 70*a* is disposed in flowpath 48' between inlet 62 and outlet 64. Valve member 70*a* is a cylindrical, elongate member configured to shift along axis A-A during operation. Valve member 70*a* has diameter D2. Diameter D2 is smaller than diameter D1 such that liquid can flow around valve member 70*a* between the outer circumferential edge of valve member 70*a* and the wall defining valve chamber 66.

Free end 78 of valve member 70*a* is disposed opposite the end connected to arm 74*a*. Free end 78 is disposed orthogonal to the portion of nozzle body 44' forming valve seat 68. Free end 78 being disposed orthogonal to the sealing surface formed by valve seat 68 ensures consistent sealing of flow valve 30*a*' during operation. Seal 76 is disposed on free end 78 of valve member 70*a*. Seal 76 is configured to engage valve seat 68 with flow valve 30*a*' in a closed state. Seal 76 can be a soft seal, such as an elastomer o-ring.

During operation, liquid enters flow valve 30*a*' through inlet 62, flows between valve member 70*a* and the wall defining valve chamber 66, and exits flow valve 30*a*' through outlet 64. Flow valve 30*a*' controls the flow rate and pressure of the liquid downstream of flow valve 30*a*'. The pressure drop across flow valve 30*a*' is a function of the linear distance L between free end 78 and outlet 64. As the linear distance L increases, the pressure drop increases and the flow rate decreases. As the linear distance L decreases, the pressure drop decreases and the flow rate increases.

The portion of flowpath 48' between flow valve 30*a*' and orifice valve 30*b*' forms a pressure chamber immediately upstream of orifice valve 30*b*'. Pressure sensor 42' is associated with that portion of the flowpath 48' and is configured to generate pressure data regarding the liquid pressure in that portion of the flowpath 48'. Pressure sensor 42' can be of any configuration suitable for sensing the liquid pressure in flowpath 48' and for generating pressure data regarding that liquid pressure. In one example, pressure sensor 42' can be diaphragm mounted on a printed circuit board disposed in nozzle body 44'. The diaphragm can be exposed to the flowpath 48'.

The liquid is ejected as a spray through orifice 58. Orifice valve 30*b*' is configured to control the size of orifice 58 during spraying. As such, orifice 58 is a variable orifice. Orifice valve 30*b*' is mounted to nozzle body 44'. Actuator 72*b* is mounted to nozzle body 44'. In the example shown, actuator 72*b* is an electric stepper motor. The number of steps are counted by a position sensor, such as sensor 28, and can be communicated to one of nozzle controller 34, control module 24, controller 46, and/or controller 46'. Valve position information for orifice valve 30*b*' can be generated based on the step count. While actuator 72*b* is described as an electric stepper motor, it is understood that actuator 72*b* can be of any type suitable for discretely altering the position of valve member 70*b*.

Valve member 70*b* defines orifice 58. In the example shown, valve member 70*b* is an impingement member configured to turn the liquid and generate the liquid spray. The liquid pressure upstream of valve member 70*b* and the size of orifice 58 control the droplet size of the liquid spray. As such, the position of valve member 70*b* is adjusted based on the spray command the liquid pressure to generate a liquid spray having the desired droplet size. While valve member 70*b* is described as an impingement member, it is understood that valve member 70*b* can be of any configuration suitable for generating the spray. Arm 74*b* extends from actuator 72*b* to valve member 70*b*. In the example shown, arm 74*b* is a shaft driven by actuator 72*b* to adjust the position of valve member 70*b*. It is understood, however, that arm 74*b* can be of any type suitable for actuating valve member 70*b*. Actuator 72*b* can be configured to drive arm 74*b* either linearly or rotatably.

Flow valve 30*a*' being an annular valve provides discrete control of the flow rate through flow valve 30*a*' and the pressure drop across flow valve 30*a*'. Annular valves provide a linear relationship between the position of valve member 70*a* and the pressure drop across the flow valve 30*a*'. Flow valve 30*a*' provides significant advantages due to the highly controllable linear relationship between flow and pressure drop. In addition, free end 78 is disposed orthogonal to valve seat 68. The orthogonal relationship allows seal 76 to be disposed on free end 78. The orthogonal relationship also prevents coining and other wear that can be experienced in other valves. In environments where no leakage is acceptable, such as in a spray nozzle 18''', the soft seal 76 provides consistent sealing regardless of valve member 70*a* movement.

Figure 5A:
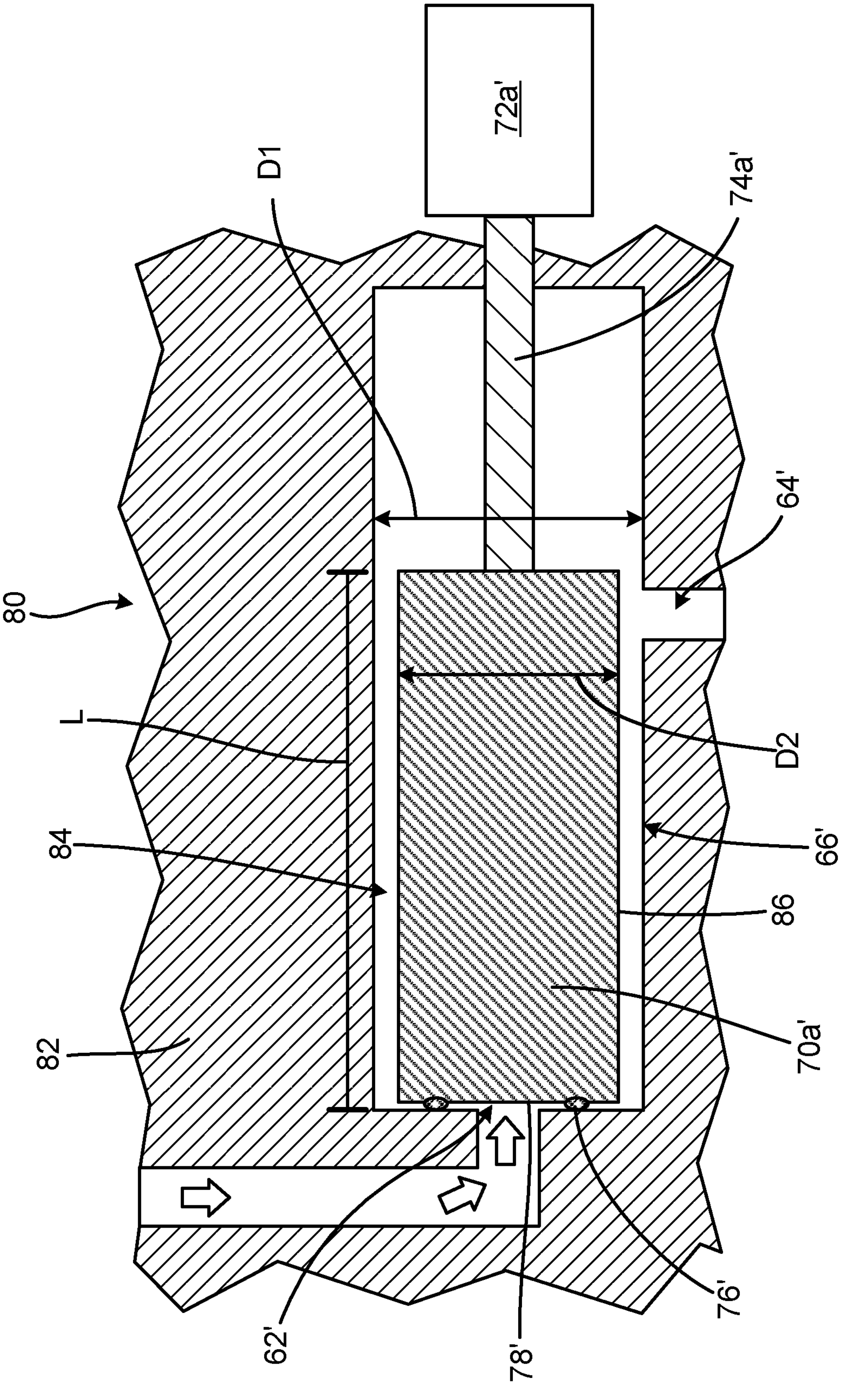
FIG. 5A is a cross-sectional view showing an annular valve in a first state.
Figure 5B:
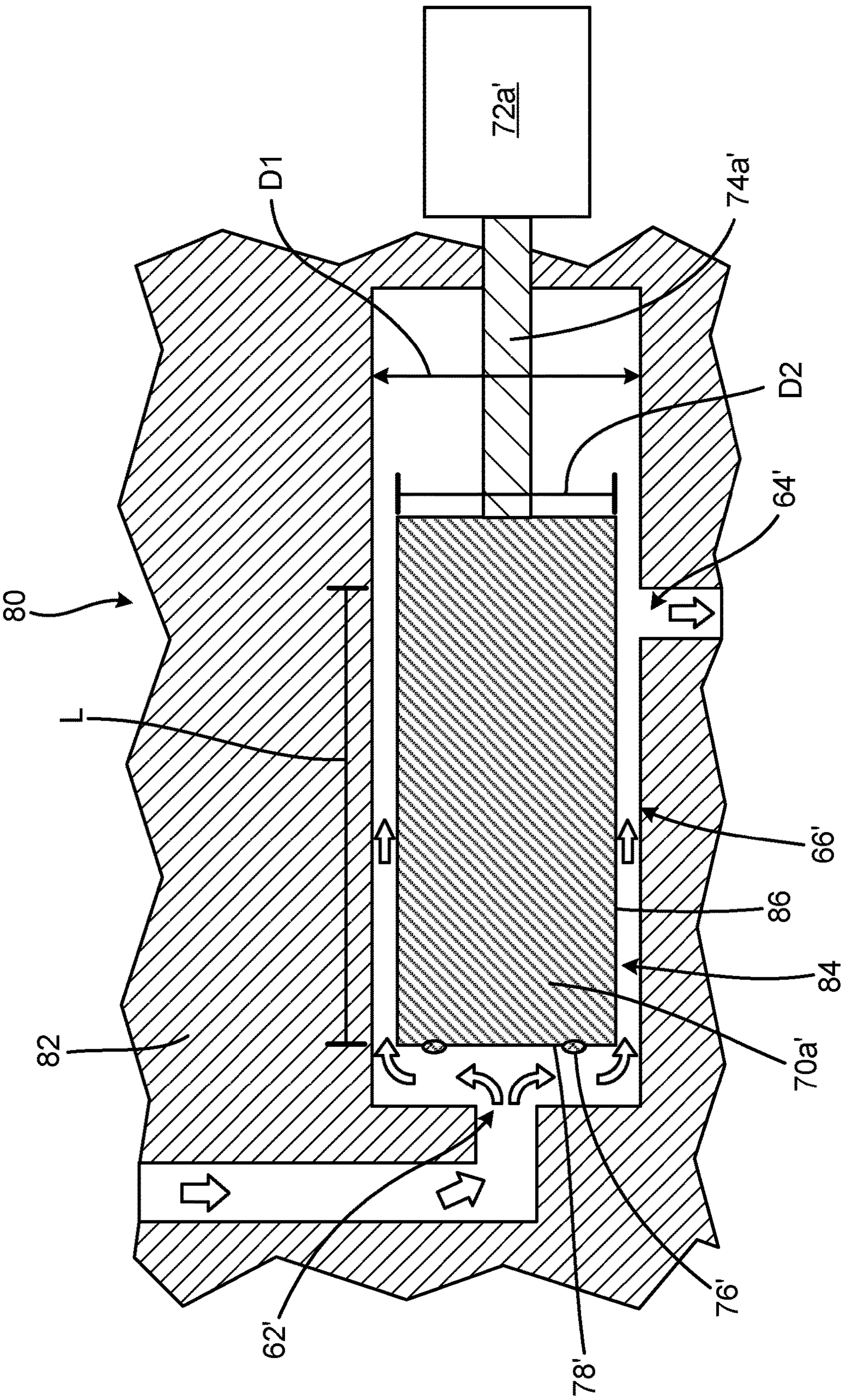
FIG. 5B is a cross-sectional view showing an annular valve in a second state.
Figure 5C:
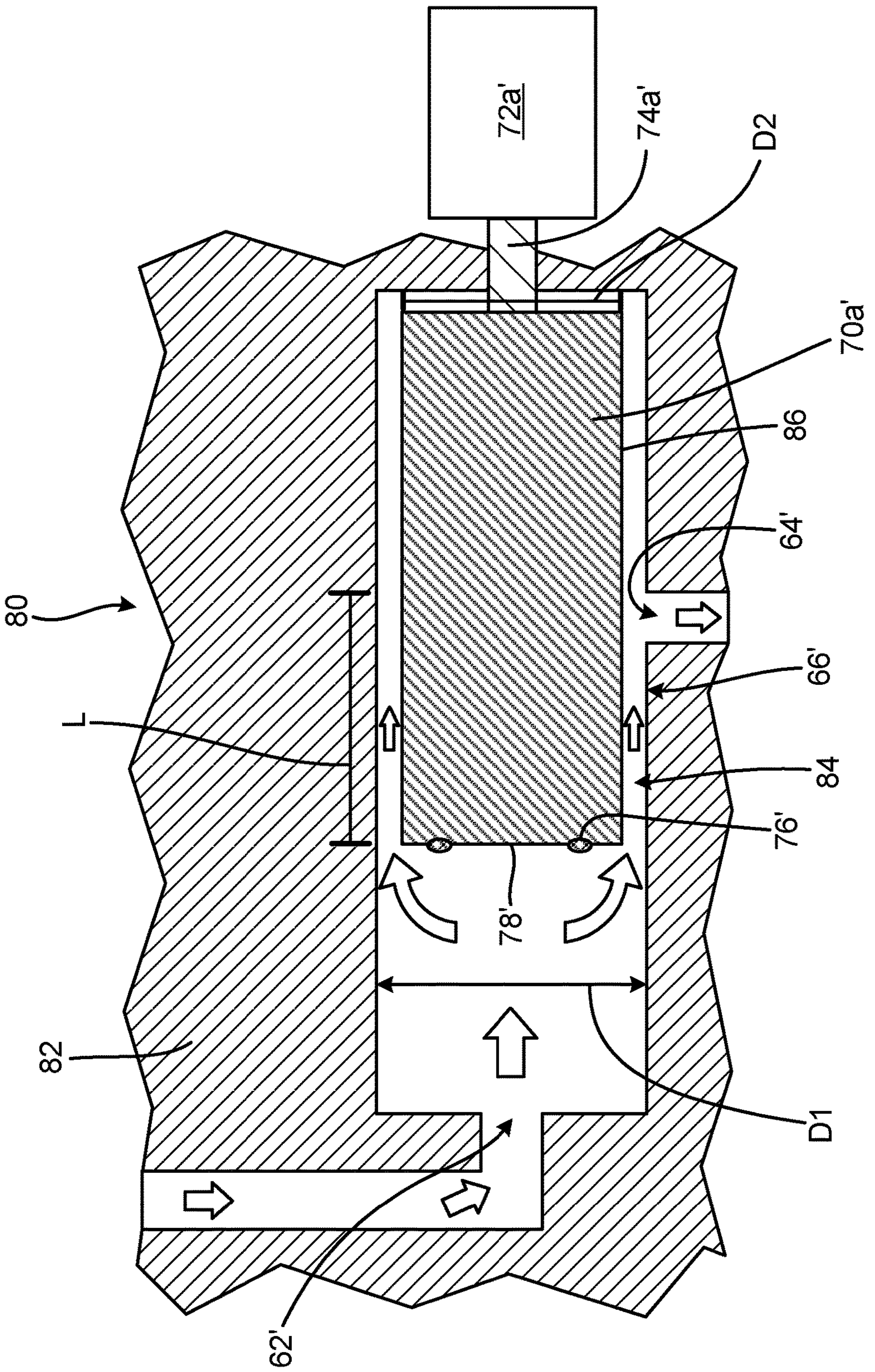
FIG. 5C is a cross-sectional view showing an annular valve in a third state.

FIG. 5A is a cross-sectional view showing annular valve 80 in a first state. FIG. 5B is a cross-sectional view showing annular valve 80 in a second state. FIG. 5C is a cross-sectional view showing annular valve 80 in a third state. FIG. 5D is a cross-sectional view of annular FIGS. 5A-5D will be discussed together. Annular valve 80 includes valve member 70*a*', actuator 72*a*', arm 74*a*', seal 76', body 82, and restrictive flowpath 84. Valve member 70*a*' includes free end 78' and edge 86. Body 82 includes inlet 62', outlet 64', and valve chamber 66'.

Annular valve 80 can be utilized as a bypass valve, such as bypass valve 32 (FIG. 1), bypass valve 32' (FIG. 2), and/or bypass valve 32" (FIG. 3). Annular valve 80 can also be utilized as a flow control valve, such as spray valve 30 (FIG. 1), orifice valve 30' (FIG. 2), flow valve 30*a* (FIG. 3), and/or flow valve 30*b* (FIG. 4). It is understood that annular valve 80 can be operated in accordance with the techniques disclosed herein.

Annular valve 80 creates a restrictive orifice to control the liquid characteristics of the liquid flowing through annular valve 80. Annular valve 80 is utilized to control the flow rate and/or pressure of the liquid flowing from inlet 62' to outlet 64'. Annular valve 80 is actively controlled to control a size of the restrictive flowpath between inlet 62' and outlet 64'. In some examples, annular valve 80 is disposed in a spray nozzle, such as nozzle 18 (FIG. 1), nozzle 18' (FIG. 2), nozzle 18" (FIG. 3), and/or nozzle 18''' (FIG. 4). In some examples, multiple ones of annular valve 80 are utilized in parallel and/or in series to control a liquid spray generated by the nozzle.

Inlet 62' extends through body 82 to valve chamber 66'. Outlet 64' extends from valve chamber 66' and through body 82. The liquid flowing through annular valve 80 enters valve chamber 66' through inlet 62' and exits valve chamber 66' through outlet 64'. In some examples, valve body 82 is a body of annular valve 80 that is separable from and replaceable within a nozzle body, such as nozzle body 44 (FIG. 2), nozzle body 44' (FIG. 3), and/or nozzle body 44" (FIG. 4). In other examples, valve body 82 is integral with the nozzle body such that valve body 82 and nozzle body 82 are unitary. For example, inlet 62', outlet 64', and valve chamber 66' can be formed, at least in part, by material removal from the nozzle body, casting, additive manufacturing, molding, and/or in any other manner suitable for forming inlet 62', outlet 64', and valve chamber 66'.

Valve member 70*a'* is disposed in valve chamber 66'. Valve member 70*a'* is elongate along valve axis A-A. Valve member 70*a'* extends between arm 74*a'* and free end 78'. In some examples, valve member 70*a'* is cylindrical. Seal 76' is disposed on first end 78'. Seal 76' is configured to form a fluid tight seal between valve member 70*a'* and valve body 82. Seal 76' can be a soft seal, such as an elastomer o-ring. While seal 76' is shown as disposed on first end 78', it is understood that seal 76' can be disposed on valve body 82.

Arm 74*a'* extends from valve member 70*a'* to actuator 72*a'*. Arm 74*a'* can be of any type suitable for displacing valve member 70*a'* within valve chamber 66'. For example, drive arm 74*a'* can be a piston, a shaft, or a screw. Actuator 72*a'* is configured to actuate drive arm 74*a'* to displace valve member 70*a'* within valve chamber 66'. For example, actuator 72*a'* can be an electric motor, a hydraulic motor, a pneumatic motor, or of any other type suitable for actuating arm 74*a'*. In some examples, actuator 72*a'* is a stepper motor. Actuator 72*a'* can be configured to rotatably and/or linearly drive arm 74*a'*.

Valve member 70*a'* defines restrictive flowpath 84 within valve chamber 66'. Valve chamber 66' has a first diameter D1. Valve member 70*a* has diameter D2. Diameter D2 is smaller than diameter D1 such that liquid can flow around valve member 70*a* between the outer circumferential edge of valve member 70*a* and the wall defining valve chamber 66. Restrictive flowpath 84 is defined between valve chamber 66' and circumferential edge 86 of valve member 70*a'*. Length L of restrictive flowpath 84 varies as valve member 70*a'* is displaced within valve chamber 66'.

During operation, actuator 72*a'* drives displacement of valve member 70*a'* within valve chamber 66' to control length L of restrictive flowpath 84. The pressure drop and flow rate of the fluid flowing from inlet 62' to outlet 64' is a function of length L. Decreasing length L reduces the pressure drop, while increasing length L increases the pressure drop.

Annular valve 80 is initially in the first state shown in FIG. 5A. With annular valve 80 in the first state, seal 76' forms a fluid tight seal between valve member 70*a'* and body 82. As such, annular valve 80 prevents liquid from flowing to outlet 64' when in the first state.

A position command is generated by a controller, such as nozzle controller 34 (FIG. 1), control module 24 (FIG. 1), controller 46 (FIG. 2), and/or controller 46' (FIG. 2), and is transmitted to actuator 72*a'*. Actuator 72*a'* powers arm 74*a'* based on the position command, thereby causing displacement of valve member 70*a'* along axis A-A. Valve member 70*a'* is pulled away from body 82 and seal 76' disengages from valve body 82, thereby opening a fluid path between inlet 62' and restrictive flowpath 84. The fluid enters valve chamber 66' through inlet 62', flows through restrictive flowpath 84, and exits valve chamber 66' through outlet 64'.

Length L of restrictive flowpath 84 controls both the flow rate through annular valve 80 and the pressure difference between the upstream liquid pressure at inlet 62' and the downstream liquid pressure at outlet 64'. For example, length L is larger with annular valve 80 in the second state shown in FIG. 5B than with annular valve 80 in the third state shown in FIG. 5C. The flow rate through annular valve 80 is greater with annular valve 80 in the state shown in FIG. 5C than in the state shown in FIG. 5B due to the shorter length L of restrictive flowpath 84. The pressure drop across annular valve 80 is greater with annular valve 80 in the state shown in FIG. 5B than in the state shown in FIG. 5C due to the longer length L of restrictive flowpath 84. As such, the pressure at outlet 64' is larger with annular valve 80 in the position shown in FIG. 5C than in with annular valve 80 in the position shown in FIG. 5B.

Annular valve 80 provides discrete control of the liquid characteristics of the spray portion. The length L of restrictive flowpath 84 has a direct relationship to the flow rate and pressure of the liquid flowing through annular valve 80. As such, utilizing annular valve 80 in a spray nozzle, such as a nozzle for an agricultural sprayer, provides greater control over the flow rate and pressure of the spray fluid flowing through annular valve 80.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A nozzle for an agricultural spraying implement, the nozzle comprising:

a nozzle body configured to mount to a distribution line to receive liquid for spraying;

a flowpath extending through the nozzle body between the distribution line and a spray outlet wherein the flowpath includes an inlet path extending from the distribution line to an intersection, a spray path extending from the intersection through which a spray portion of the liquid flows to the spray outlet, and a bleed path extending from the intersection, wherein the bleed path extends from the intersection to a bleed valve such that a portion of the bleed path is disposed between the intersection and the bleed valve;

the bleed valve in the nozzle body disposed in the bleed path downstream of the intersection and configured to control flow of the liquid through the bleed path, wherein the bleed valve is an active valve controllable between an open state fluidly connecting the inlet path and a portion of the bleed path downstream of the bleed valve, and a closed state fluidly disconnecting the flowpath;

an orifice valve in the nozzle body separate from the bleed valve and disposed on the flowpath and configured to control flow of a spray portion of the liquid through the spray outlet; and at least one parameter sensor configured to generate parameter data regarding the spray portion;

wherein the nozzle is configured to communicate with a controller such that the controller actuates the bleed valve to a bleed position based on the parameter data to allow the bleed portion of the liquid to flow through the bleed path and to control a flowrate of the spray portion of the liquid through the spray path.

2. The nozzle of claim 1, wherein the at least one parameter sensor includes a pressure sensor disposed on the spray path and configured to generate pressure data regarding the spray portion.

3. The nozzle of claim 2, wherein the at least one parameter sensor includes a flow meter disposed in the nozzle body and configured to generate flow data regarding the spray portion.

4. The nozzle of claim 1, wherein a flow control valve is disposed on the inlet path upstream of the intersection and wherein the flow control valve is configured to control flow of the liquid through the flowpath.

5. The nozzle of claim 4, wherein the flow control valve comprises:

an actuator mounted to the nozzle body;

an arm extending from the actuator;

an elongate member connected to the arm, the elongate member disposed in a valve chamber within the nozzle body;

wherein the actuator is configured to drive the arm to cause the elongate member to shift axially within the valve chamber; and wherein the elongate member is cylindrical.

6. The nozzle of claim 5, wherein: the valve chamber includes an inlet and an outlet;

the elongate member includes a distal end disposed orthogonal to the inlet; and the distal end of the elongate member is configured to interface with a portion of the nozzle body disposed about the inlet when the flow control valve is in a closed state.

7. The nozzle of claim 6, wherein the flow control valve further comprises:

a seal disposed on the distal end, the seal configured to interface with the portion of the nozzle body when the flow control valve is in the closed state.

8. The nozzle of claim 7, wherein the seal is an O-ring.

9. The nozzle of claim 4, wherein the flow control valve is an annular valve.

10. The nozzle of claim 1, wherein the bleed valve includes an actuator operatively connected to an elongate member, the actuator configured to drive the elongate member along a valve axis.

11. The nozzle of claim 10, wherein the actuator is an electric motor.

12. The nozzle of claim 11, wherein the actuator is a stepper motor.

13. The nozzle of claim 10, further comprising:

a flow control valve disposed on the inlet path upstream of the intersection, the flow control valve configured to control flow of the liquid through the inlet path to the intersection.

14. The nozzle of claim 13, wherein the parameter sensor is disposed on the spray path.

15. The nozzle of claim 1, wherein:

each of the bleed valve, the orifice valve, and the at least one parameter sensor are configured to communicate with the controller such that the controller controls actuation of each of the bleed valve and the orifice valve.

16. The nozzle of claim 1, wherein the controller is a nozzle controller integrated into the nozzle.

17. An agricultural spraying implement comprising:

a storage tank supported by the agricultural spraying implement and configured to store a supply of spray liquid;

a plurality of nozzles configured to receive the spray liquid from the storage tank, wherein a first one of the plurality of nozzles comprises the nozzle of claim 1; and the controller communicatively coupled to at least one of the plurality of nozzles.

18. The agricultural spraying implement of claim 17, wherein the bleed valve comprises an annular valve.

* * * * *